(12) United States Patent
Balamucki et al.

(10) Patent No.: US 7,717,823 B2
(45) Date of Patent: May 18, 2010

(54) METHOD AND APPARATUS FOR CHANGING SHIFT SCHEDULING MODES OF AUTOMATED MECHANICAL TRANSMISSION

(75) Inventors: Thomas Balamucki, Greensboro, NC (US); Robert A. Sayman, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 477 days.

(21) Appl. No.: 11/604,512

(22) Filed: Nov. 27, 2006

(65) Prior Publication Data
US 2008/0125283 A1 May 29, 2008

(51) Int. Cl.
*B60W 10/04* (2006.01)
*B60W 10/10* (2006.01)

(52) U.S. Cl. .......................... 477/115; 477/94
(58) Field of Classification Search .................. 477/40, 477/41, 78, 94, 109, 115; 74/335; 701/52
See application file for complete search history.

(56) References Cited

U.S. PATENT DOCUMENTS

| | | | |
|---|---|---|---|
| 4,899,858 A * | 2/1990 | Cote et al. ................... 477/83 |
| 4,930,078 A * | 5/1990 | Dunkley et al. ............... 701/52 |
| 5,050,079 A | 9/1991 | Steeby et al. |
| 5,053,962 A | 10/1991 | Genise |
| 5,089,965 A | 2/1992 | Braun |
| 5,406,861 A | 4/1995 | Steeby |
| 6,067,492 A * | 5/2000 | Tabata et al. .................. 701/51 |
| 6,148,691 A | 11/2000 | Ganski et al. |
| 6,353,787 B2 * | 3/2002 | Nishiyama .................... 701/93 |
| 6,470,771 B2 * | 10/2002 | Nanri et al. ................. 74/733.1 |
| 6,658,339 B1 | 12/2003 | Wright et al. |
| 6,814,687 B2 | 11/2004 | Jäger et al. |
| 2003/0060328 A1 | 3/2003 | Beaty |
| 2005/0272555 A1 * | 12/2005 | Tabata et al. .................... 477/2 |

* cited by examiner

*Primary Examiner*—David D Le
(74) *Attorney, Agent, or Firm*—Brinks Hofer Gilson & Lione (57) ABSTRACT

A method of and apparatus for operating an automated mechanical transmission (AMT) achieves switching between and selecting one of a plurality of automated mechanical transmission shift scheduling modes. Such switching or selection occurs and is controlled by the vehicle operator undertaking a sequence of non-routine operating steps or inputs which are interpreted by a microprocessor or controller as a request for a change of the shift scheduling mode.

19 Claims, 5 Drawing Sheets

METHOD AND APPARATUS FOR CHANGING SHIFT SCHEDULING MODES OF AUTOMATED MECHANICAL TRANSMISSION

BACKGROUND OF THE INVENTION

The invention relates generally to operating methods and apparatus relating to automated mechanical transmissions (AMT's) and more particularly to a method and apparatus for selecting one of a plurality of automated mechanical transmission shift scheduling modes and associated software.

Automated mechanical transmissions may be accurately characterized as comprising two components: a multiple speed gear change transmission having pneumatic, electric or hydraulic actuators which control translation of transmission shift rails and a microprocessor based electronic control unit which receives data from multiple sensors which sense, for example, shaft speeds, engine operation and operator commands and provides transmission and clutch actuators with control signals based upon stored software embodying specific shift scheduling modes.

While the transmission and actuators are fairly characterized as sophisticated, it is the operating algorithms and related memory and control systems of the electronic control unit which controls overall operation of the transmission and its actuators to which the designation sophisticated is most aptly applied. The engineering and program or software choices embodied in the controller and algorithms are primarily responsible for satisfying the vehicle operator, achieving smooth, predictable and safe vehicle operation, providing improved fuel efficiency and extending the service life of components such as the master friction clutch.

One of the benefits of automated mechanical transmissions and particularly the algorithms and data systems of the associated electronic control units is the ability to provide a transmission shift scheduling mode optimized for a particular operating condition or set of conditions such as performance, fuel economy, a routinely encountered operating condition such as urban congestion or steep grade associated with mountain operation, a particular tractor manufacturer's operating preferences, even a particular vehicle operator's preferences or any other specific or unique operating parameters.

Generally speaking, to change from one shift scheduling mode to another, that is, to change from one set of operating algorithms to another, requires removal or deletion of the undesired software and downloading of the new software. This activity is preferably undertaken only by a tractor dealership or authorized service organization and typically requires expensive service tools and highly skilled technicians.

The present invention presents a method and apparatus for addressing these difficulties of the prior art and providing improved automated mechanical transmission performance.

SUMMARY OF THE INVENTION

A method of and apparatus for operating an automated mechanical transmission (AMT) achieves switching between and selecting one of a plurality of automated mechanical transmission shift scheduling modes. Such switching or selection occurs and is controlled by the vehicle operator undertaking a sequence of non-routine operating steps or inputs which are interpreted by a microprocessor or controller as a request for a change of the shift scheduling mode.

Thus it is an object of the present invention to provide a method for selecting one of a plurality of automated mechanical transmission shift scheduling modes.

It is a further object of the present invention to provide a method for facilitating operator selection of one of a plurality of transmission shift scheduling modes.

It is a further object of the present invention to provide a method for facilitating operator selection of, for example, a performance, fuel efficiency, or the predetermined shift scheduling mode of operation of an automated mechanical transmission.

It is a further object of the present invention to provide a method for selecting one of a plurality of automated mechanical transmission shift scheduling modes through a sequence of non-routine operating steps undertaken by the vehicle operator.

It is a still further object of the present invention to provide an apparatus for selecting one of a plurality of automated mechanical transmission shift scheduling modes.

It is a still further object of the present invention to provide an apparatus for selecting one of a plurality of automated mechanical transmission shift scheduling modes through a sequence of non-routine operating steps undertaken by the vehicle operator.

Further objects and advantages of the present invention will become apparent by reference to the following description of the preferred embodiment and appended drawings wherein like reference numbers refer to the same component, element or feature.

DESCRIPTION OF THE PREFERRED EMBODIMENTS

Figure 1:
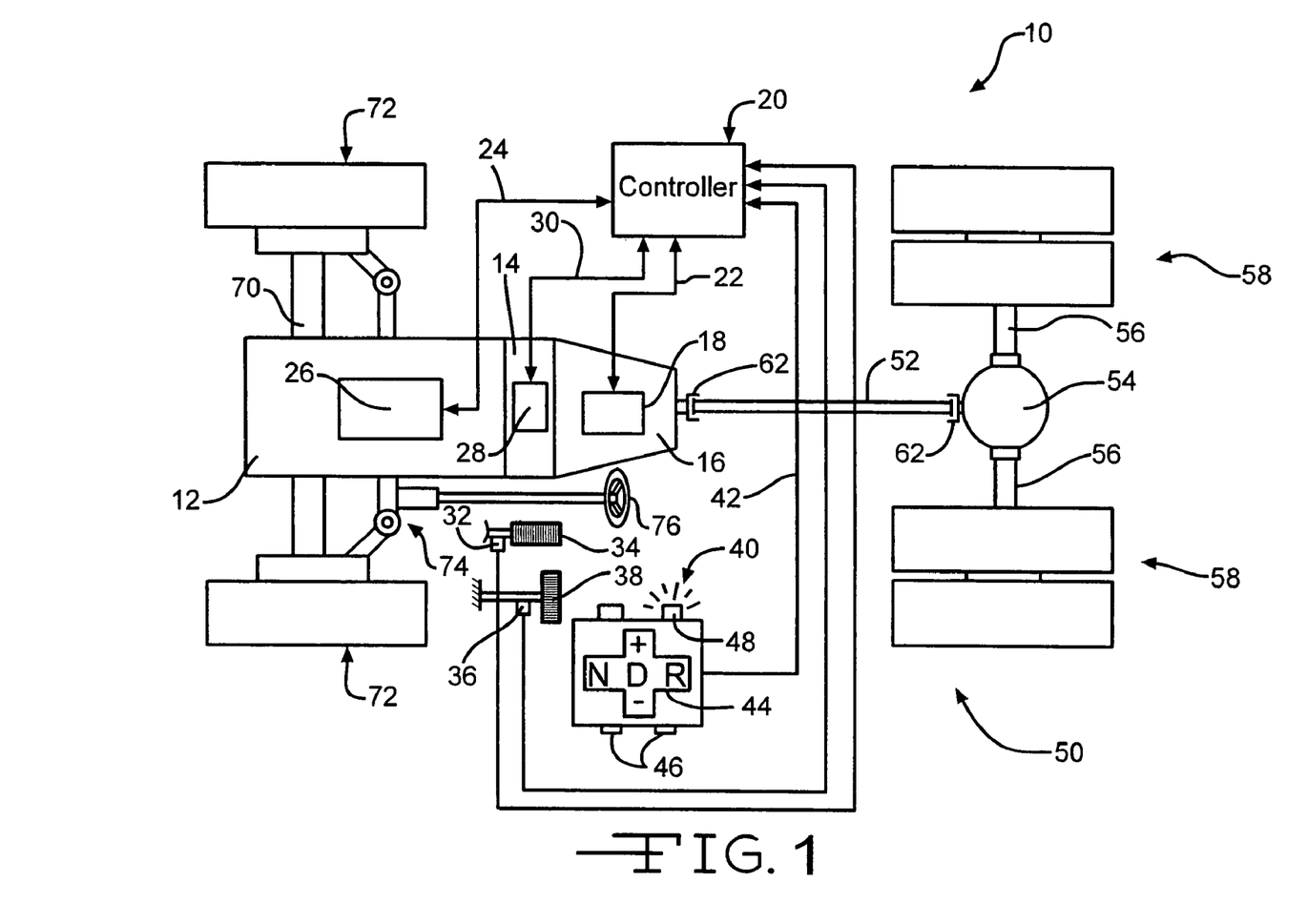
FIG. 1 is diagrammatic plan view of a truck tractor incorporating the present invention.

Referring now to FIG. 1, a diagrammatic, plan view of a typical truck tractor incorporating the present invention is illustrated and generally designated by the reference number 10. The truck tractor 10 includes a prime mover 12 which may be an internal combustion gas or Diesel engine having an output provided directly to a master friction clutch 14. The master friction clutch 14 selectively and positively engages the output of the prime mover 12 to an input of a multiple speed, gear change transmission 16. The transmission 16 is preferably of the type designated as an automated mechanical transmission (AMT) wherein gear or speed ratio changes of a splitter, a main transmission, and a planetary gear assembly, for example, are all achieved by an automated, i.e., electric, hydraulic or pneumatic, shift actuator assembly 18. A master controller or microprocessor 20 (also referred to as an electronic control unit or ECU) is connected through a data or control link 22 to the shift actuator assembly 18. The master controller or microprocessor 20 includes a plurality of data input ports, memory, one or more processors, look up tables, and a plurality of data and control outputs.

The master controller or microprocessor 20 is preferably coupled by a data and control link 24 to an engine controller 26. The engine controller 26 is an integral component of the prime mover 12 and will typically include a microprocessor or microcontroller which receives data from an engine speed sensor and other sensors or devices (not illustrated) and controls, for example, a fuel control or metering device capable of adjusting and terminating the flow of fuel to the prime mover 12 and thus its speed. The master friction clutch 14 also includes a master friction clutch operator assembly 28 which is coupled to the master controller 20 by a data and control link 30 and which controls the engagement and disengagement of the master friction clutch 14. A throttle position sensor 32 senses the position of a vehicle throttle or accelerator pedal 34 and provides real time data regarding the position of the throttle pedal 34 to the master controller 20, which, in turn, typically will provide such data to the engine controller 26. A two state switch or sensor 36 senses displacement, i.e., depression, of a brake pedal 38 and provides a signal to the master controller 20 that the vehicle brakes have been at least partially activated.

Also disposed in the cab of the truck tractor 10 is an operator adjustable gear selector lever assembly 40 which is coupled by a data and control link 42 to the master controller 20. The gear selector assembly 40 defines a shift pattern or gate 44 through which the vehicle operator may translate a control lever, handle or paddle (all not illustrated) to select, for example, whether the master controller 20 will automatically select and shift between available gears of the transmission 16 or defeat or override such automatic selection and manually select and engage a desired gear. One or more function push buttons or toggle switches 46, for example, may be utilized to receive commands from the operator and provide them to the master controller 20. The push buttons or toggle switches may be mounted on the control lever if desired. One or more alphanumeric readouts or indicator lights 48 may be disposed on or adjacent the gear selector assembly 40 to provide a visual indicator to the vehicle operator of the operation, gear selection, mode and other conditions relating to the transmission 16.

The output of the transmission 16 is provided to a rear driveline assembly 50 a rear propshaft 52 which drives a conventional rear differential 54. The rear differential 54 provides drive torque to a pair of rear axles 56 which are, in turn, coupled to left and right rear tire and wheel assemblies 58 which may be either a dual configuration illustrated or a single left and right tire and wheel assembly. Suitable universal joints 62 may be utilized as necessary with the rear propshaft 52 to accommodate static and dynamic offsets and misalignments thereof. A stationary front axle 70 pivotally supports a pair of front tire and wheel assemblies 72 which are controllably pivoted by a steering linkage 74 which is coupled to and positioned by a steering wheel 76.

As noted above, a typical vehicle automated mechanical transmission may be operated in various shift scheduling modes, for example, one shift scheduling mode, or shift mode for short, may be designated a performance mode and will delay shifts and allow the engine to rev somewhat higher before an upshift is made. Contrariwise, an economy shift mode may perform an upshift as soon as practicable thereby maintaining low engine rpm and, generally speaking, improved fuel economy. Other shift modes may incorporate requirements of a particular fleet operator, a particular vehicle operator or may include features, steps and sequences which accommodate various highway or geographic conditions. Typically, such shift modes are downloaded into the master controller 20. When it is desired to revise or substitute one shift scheduling mode for another, it is generally necessary to remove the old software and load the new software into the master controller 20 at a dealership or service location.

The present invention involves not only the storage of two or more shift scheduling modes in the master controller 20 but also the use of, for example, one or more of the shift lever (the Drive-Neutral-Reverse control), a shift lever function push button 46, the brake pedal 38 or the throttle pedal 34 in a non-routine or non-standard fashion or sequence of steps to signal the master controller 20 that the vehicle operator is desirous of changing the shift scheduling mode. Not only may different sequences of activation of the foregoing controls institute such a shift scheduling mode change, but also such instituted change may have different operating characteristics. For example, the new shift scheduling mode may be permanently engaged in a fashion similar to the current practice of automated mechanical transmissions and shift scheduling modes. As a first alternative, the newly selected shift scheduling mode may be invoked for some predetermined period of time, for example, ten seconds, one minute, one day, or one ignition cycle. As a third alternative, each commanded shift scheduling mode change might toggle between two preselected modes. Last of all, each shift mode command may increase or index one step in a sequence of three or more shift scheduling modes. To achieve these features and desirable goals, various software or programs may be stored and utilized in the master controller 20.

Figure 2:
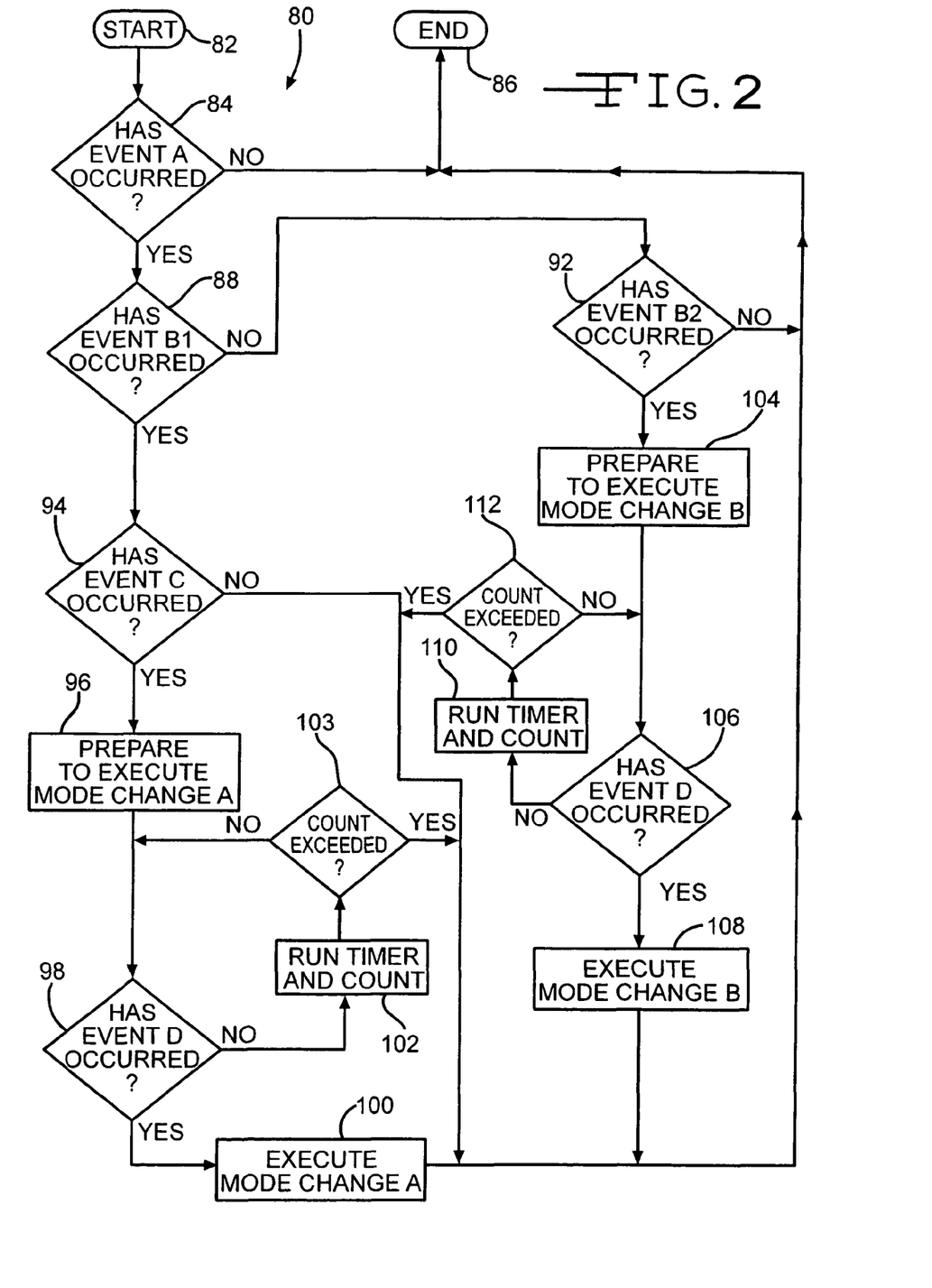
FIG. 2 is a first embodiment of a general computer software flow chart according to the present invention.
Figure 3:
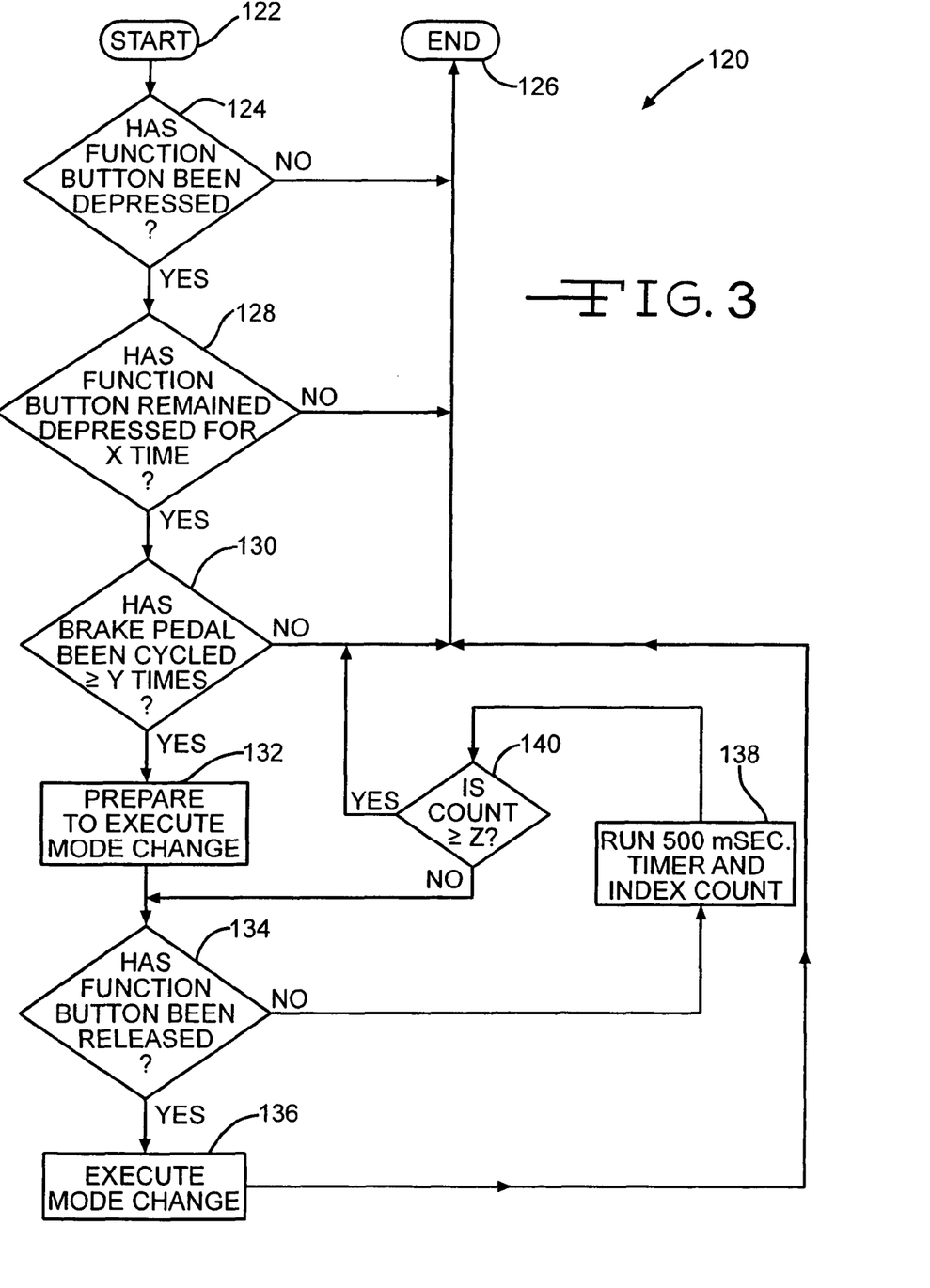
FIG. 3 is a second embodiment of a computer software flow chart according to the present invention.
Figure 4:
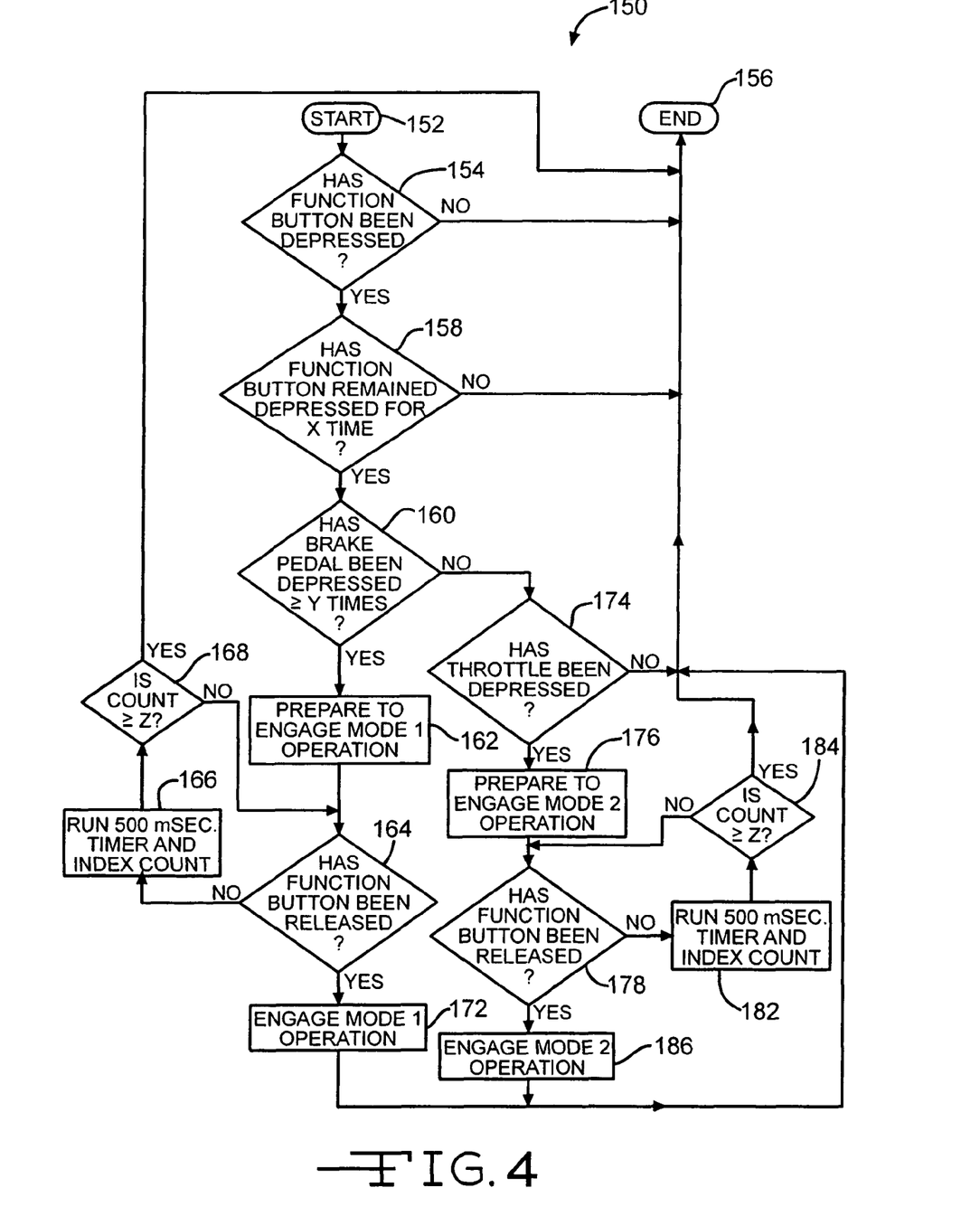
FIG. 4 is a third embodiment of a computer software flow chart according to the present invention.
Figure 5:
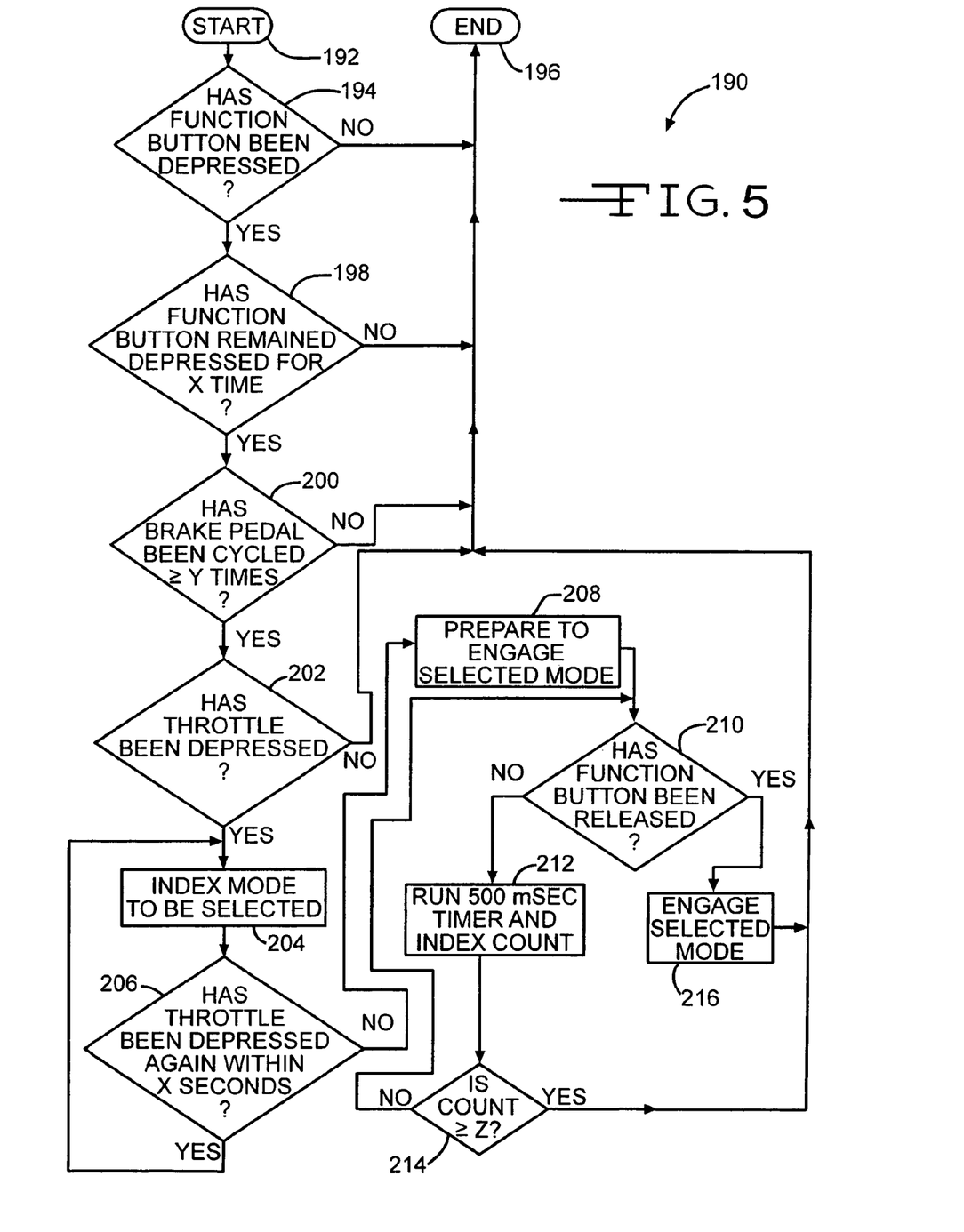
FIG. 5 is a fourth embodiment of a computer software flow chart according to the present invention.

Referring now to FIG. 2, the general sequence of steps is set forth in what is accurately characterized as a generic program 80. The generic program 80 is presented here without reference to particular data inputs or signals and illustrates the general decision points and process steps which constitute the method of the invention. In FIGS. 3, 4 and 5, this generic program 80 is modified to include distinct inputs and commands to achieve specific operating sequences and command outputs.

The generic program 80 begins with an initialization step 82 which may clear any erasable data registers, read any data inputs and confirm or respond to any system checks. The program 80 then moves to a decision point 84 which inquire whether an event A has occurred. Specific A events will be discussed below with regard to FIGS. 3, 4, and 5. Generally speaking, event A will be some operator initiated command such as activation of a function push button 46 or other operator activatable switch which will begin but not independently complete a shift scheduling mode change. If event A has not occurred, the decision point 84 is exited at NO and the program 80 concludes at an end point 86. If event A has occurred, decision point 84 is exited at YES and the program 80 enters a decision point 88 which inquires whether an event B1 has occurred. Event B1 may relate to, for example, how long event A has occurred or it may relate to a positive response or signal from a sensor in the truck tractor 10. If event B1 has not occurred, the decision point 88 is exited at NO and the program 80 moves to a third decision point 92 which inquires whether a related event B2 has occurred. Event B2 may be a time shorter than event B1 or it may relate to, once again, a positive response from the vehicle operator or a vehicle sensor. If event B2 has not occurred, the decision point 92 is exited at NO and the program 80 concludes at the end point 86.

Returning to the decision point 88, if event B1 has occurred, the decision point 88 is exited at YES and the program 80 moves to a fourth decision point 94 which inquires whether a third event C has occurred. If event C has occurred, for example, repeated tapping or depressing of the brake pedal 38 or throttle pedal 34, the decision point 94 is exited at YES and the program 80 moves to a process step 96 which prepares to execute a particular shift scheduling mode change A. From process step 96, the program 80 moves to a decision point 98 which inquires whether an event D has occurred. Event D may be, for example, the release of the function push button 46 or some other action performed by the vehicle operator which indicates acceptance of and concurrence with the selected mode change as indicated, for example, by the readouts or lights 48. If event D has occurred, the decision point 98 is exited at YES and the program 80 moves to a process step 100 which executes the mode change A. The mode change A may be any of those shift scheduling mode changes discussed above. The program then moves to the end point 86. If event D has not occurred, the decision point 98 is exited at NO and a process step 102 is undertaken which runs a short interval timer, for example, 500 milliseconds or one second or more or less and also indexes a counter. The program 80 then moves to a decision point 103 which inquires whether a small whole number count, such as 3, 4, 5, 8 or 10 has been exceeded. If it has not, the program 80 returns to the input of the decision point 98. If the count equals or exceeds a maximum iteration number, the program 80 will end at the end point 86, as will be more fully explained with reference to FIGS. 3, 4 and 5.

Returning now to the decision point 92, if event B2 has occurred, the decision point 92 is exited at YES and the program 80 moves to a process step 104 which prepares to execute a mode change B. The program 80 then moves to a seventh decision point 106 which inquires whether event D has occurred. Event D may also be the release of the function push button 46 or some other operator initiated event. If event D has occurred, the decision point 106 is exited at YES and the program 80 enters a process step 108 which executes mode change B and then terminates at the end point 86. If event D has not occurred, the decision point 106 is exited at NO and a process step 110 is entered which runs an interval timer and indexes a counter as described with regard to process step 102. When the run timer, for example, 500 milliseconds, one second or longer or shorter time, of the process step 110 has expired, the program 80 moves to a decision point 112 which inquires whether a small whole number count of iterations has been exceeded. If it has not, the decision point 112 is exited at NO and the program 80 returns to the input of decision point 106. If the maximum number of iterations of the decision point 112 has been exceeded it is exited at YES and the program 80 terminates at the end point 86.

Referring now to FIG. 3, a first specific embodiment of a computer program or software is illustrated and designated by the reference number 120. The first specific software 120 begins with an initialization or start step 122 which, as noted above, may clear or reset registers and read external data, for example. The program 120 then moves to a decision point 124 which inquires whether a function push button 46 or similar control has been depressed. If it has not, the decision point 124 is exited at NO and the program or software 120 terminates at an end point 126. If the function button 46 has been depressed, the decision point 124 is exited at YES and the program 120 moves to a decision point 128 which inquires whether the function button 46 has remained depressed for X time or longer which may be a predetermined time such as two seconds, three seconds, five seconds or an appropriate longer or shorter time. It will be appreciated that the inquiry of decision point 128 may be combined with the decision point 124 but for purposes of clarity and completeness, they are presented separately in FIG. 3 and the other related Figures.

If the function button 46 has not remained depressed for the predetermined time X or longer, the decision point 128 is exited at NO and the program 120 terminates at the end point 126. If the function button 46 has remained depressed for longer than the predetermined time X, the decision point 128 is exited at YES and the program 120 moves to a decision point 130 which inquires whether the brake pedal 38 has been cycled at least Y times. By cycled, it is meant that the brake pedal 38 has been at least partially and repeatedly tapped or depressed as sensed by the brake pedal sensor 36. The number Y is preferably 2, 3 or 4, for example, or more or less. If the brake pedal 38 has not been depressed at least Y times, the decision point 130 is exited at NO and the program 120 terminates at the end point 126. If the brake pedal 38 has been cycled or depressed at least Y times as sensed by the brake pedal sensor 36, the decision point 130 is exited at YES and a process step 132 is entered which prepares to execute a predetermined or pre-selected shift scheduling mode change. This mode change may be, for example, any of those discussed above. Next, the program 120 moves to a decision point 134 which inquires whether the function button 46 has been released. If it has, the decision point 134 is exited at YES and a process step 136 is entered which executes the predetermined or pre-selected mode change. The program then terminates at the end point 126.

If the function button 46 has not been released, the decision point 134 is exited at NO and the program 120 moves to a process step 138 which times out a short period of time, for example, 500 milliseconds or one second or more or less and indexes a counter by one count. A decision point 140 is then entered which determines whether the count is equal to or greater than a predetermined value Z. If the count is below the predetermined value Z, which may be a number indicating the number of iterative cycles and may preferably be a number between 5 and 10 or more or less, the decision point 140 is exited at NO and the program 120 returns to the decision point 134 which again inquires whether the function button 46 has been released. If the indexed count equal or exceeds the predetermined value Z, indicating that the function button 46 has remained depressed for, for example, 5, 10 or 15 seconds after the brake pedal 38 has been cycled, the program 120 defaults to the end point 126 without effecting a mode change.

Referring now to FIG. 4, a second specific computer software or program 150 is illustrated which achieves exclusive selection of one of two shift scheduling modes based upon operator activation of either the brake pedal 38 or the throttle pedal 34 while the function button 46 is depressed. The second specific program 150 begins with an initialization or start step 152 which, as noted above, may clear or reset registers and read external data, for example. The program 150 then moves to a decision point 154 which inquires whether the function button 46 or a similar control has been depressed. If it has not, the decision point 154 is exited at NO and the program 150 terminates at an end point 156. If the function button 46 has been depressed, the decision point 154 is exited at YES and the program 150 moves to a decision point 158 which inquires whether the function button 46 has remained depressed for at least than X time which may be a predetermined time such as two seconds, three seconds, five seconds or an appropriately longer or shorter time. It will be appreciated that the inquiry of decision point 158 may be combined with the inquiry of the decision point 154 but for purposes of clarity and completeness, they are presented separately in FIG. 4 and the other related Figures. If the function button 46 has not remained depressed for longer than the predetermined time X, the decision point 158 is exited at NO and the program 150 terminates at the end point 156.

If the function button 46 has remained depressed for the predetermined time X or longer, indicating that the vehicle operator is desirous of engaging the mode changing program, the decision point 158 is exited at YES and the program 150 moves to a decision point 160 which inquires whether the brake pedal 38 as sensed by the brake pedal sensor 36 has been depressed at least Y times wherein Y is a whole number, for example, 2, 3 or 4. If the brake pedal 38 has been tapped or depressed at least Y number of times, the decision point 160 is exited at YES and the software or program 150 moves to a process step 162 which prepares to engage Mode One, that is, a first shift scheduling mode of operation. The program 150 then moves to a decision point 164 which inquires whether the function button 46 has been released. If it has not, the decision point 164 is exited at NO and a process step 166 is executed which runs a short interval timer of, for example, 500 milliseconds, one second or more or less and also indexes a counter. Then, a decision point 168 is entered which inquires whether the current count is at least Z, a predetermined small whole number such as 4, 5, 7, 8 or 10 or more or less. If the count is not at least the predetermined value of Z, the decision point 168 is exited at NO and the program 150 returns to the decision point 164. If the count is equal to or greater than Z, indicating that the function button 46 has remained depressed for a relatively long period of time, the program 150 defaults, the decision point 168 is exited at YES and the program 150 terminates at the end point 156.

Returning to the decision point 164, if the function button 46 has been released, the decision point 164 is exited at YES and a process step 172 is executed which commands engagement of Mode One operation. The program 150 then terminates at the end point 156.

Returning to the decision point 160, if the brake pedal 38 has not been depressed at least Y times, the decision point 160 is exited at NO and the program 150 enters a decision point 174 which inquires whether the throttle pedal 34 has been depressed or tapped as sensed by the throttle pedal sensor 32. If it has not been depressed, the decision point 174 is exited at NO and the program 150 terminates at the end point 156. If the throttle pedal 34 has been depressed, the decision point 174 is exited at YES and the program 150 moves to a process step 176 which prepares to engage Mode Two, i.e., a second shift scheduling mode of operation. In the following decision point 178, inquiry is made as to whether the function button 46 has been released. If it has not, the decision point 178 is exited at NO and the program 150 moves to a process step 182 which runs a 500 millisecond or longer or shorter timer and indexes a counter by one count.

Next, a decision point 184 inquires whether the count is equal to or greater than a predetermined value Z which, as in the decision point 168, may be a small whole number. If the count is at least equal to the predetermined value Z, the decision point 184 is exited at YES and the program 150 defaults at the end point 156 without changing the mode of operation of the transmission 16. If the count is less than the predetermined value Z, the decision point 184 is exited at NO and the program 150 returns to the input of the decision point 178. If the function button 46 has been released, the decision point 178 is exited at YES and the program 150 moves to a process step 186 which engages Mode Two of the transmission 16. Then the program 150 terminates at the end point 156. Mode One and Mode Two as used directly above refers to any two or the several shift scheduling modes discussed above.

Referring now to FIG. 5, a third specific computer program or software 190 is illustrated which achieves sequential selection and engagement of one of several modes of operation of the transmission 16 based upon repeated operator actuation of the throttle pedal. The third specific software 190 commences with an initialization or start step 192 which, in a manner similar to the initialization steps above may clear or reset registers and read external data, for example. The program 190 then moves to a decision point 194 which inquires whether the function button 46 or a similar control has been depressed by the vehicle operator. If it has not, the decision point 194 is exited at NO and the program 190 terminates at an end point 196. If the function button 46 has been depressed, the decision point 194 is exited at YES and the program 190 moves to a decision point 198 which inquires whether the function button 46 has remained depressed for X time (or longer). X time may be a predetermined time such as two seconds, three seconds, five seconds or an appropriately longer or shorter time. It will be appreciated that the inquiry of decision point 194 may be combined with the inquiry of the decision point 196 by inquiring whether the function button 46 has been depressed for X time. However, for purposes of clarity and completeness, these steps are presented separately in FIG. 5 and the other related Figures. If the function button 46 has not remained depressed for the predetermined time X, the decision point 198 is exited at NO and the program 190 terminates at the end point 196.

If the function button 46 has remained depressed for X time, the decision point 198 is exited at YES and the program 190 moves to a decision point 200 which inquires whether the brake pedal 38 has been depressed or tapped at least Y times. If the brake pedal 38 has not been depressed at least Y times, the decision point 200 is exited at NO and the program 190 concludes at the endpoint 196. If the brake pedal 38 has been depressed at least Y times, the decision point 200 is exited at YES and the program 190 moves to a decision point 202 which inquires whether the throttle pedal 34 has been depressed or tapped during a defined time interval or window. If the throttle pedal 34 has not been depressed, the decision point 202 is exited at NO and the program 190 terminates at the end point 196. If the throttle pedal 34 has been depressed, the decision point 202 is exited at YES and a process step 204 is entered which indexes the shift scheduling mode to be selected one step from the currently engaged mode. Such modes may be simply numbered within the program 190 and master controller 20 such as Mode 1, Mode 2, Mode 3, etc. As noted previously, such shift scheduling modes may be, for example, a performance mode, an economy mode, a hold mode or some other specific operation or condition specific mode. The currently selected mode may and preferably will be indicated to the vehicle operator by the indicator 48 such as a light, numerical readout or audible chime or buzzer.

The program 190 then moves to a decision point 206 which inquires whether the throttle pedal 34 has been depressed or tapped again within X seconds. X may be a relatively small number such as 1, 2 or 3 or more or less as appropriate. If the throttle pedal 34 has been depressed within the X time window, the decision point 206 is exited at YES and the program 190 returns to the process step 204 which indexes or increases the number of the shift scheduling mode to be selected by one. If the throttle pedal 34 has not been depressed again within the defined X time, the decision point 206 is exited at NO and a process step 208 is entered which prepares to engage the selected operating mode of the transmission 20. The program 190 then moves to a decision point 210 which inquires whether the function button 46 has been released. If it has not, the decision point 210 is exited at NO and a process step 212 is entered which runs a 500 millisecond timer or a timer of shorter or longer duration and also indexes a counter. A decision point 214 is then entered which determines whether the indexed count is equal to or greater than a predetermined value Z which may be 4, 5, 8, 10 or more or less as appropriate. If the count Z, is at least equal to the decision point 214 is exited at YES and no mode shift is undertaken due to the operators' continued holding of the function button 46. If the predetermined count Z has not been equaled or exceeded, the decision point 214 is exited at NO and the program 190 returns to the input of the decision point 210 to once again inquire whether the function button 46 has been released. If the function button 46 has been released, the decision point 210 is exited at YES and a process step 216 is entered and executed which engages the newly selected shift scheduling mode of the transmission 20. The program 190 then terminates at the end point 196.

The foregoing disclosure is the best mode devised by the inventors for practicing this invention. It is apparent, however, that apparatus incorporating modifications and variations will be obvious to one skilled in the art of controlling automated mechanical transmissions. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

The invention claimed is:

1. A method of selecting a shift scheduling mode of an automated mechanical transmission for a forward direction of travel comprising the steps of:
   detecting a first event indicative of an actuation of a transmission function switch;
   detecting a second event indicative of an actuation of a first driver input device a predetermined number of times;
   detecting a third event indicative of an actuation of a second driver input device a number of times corresponding to the shift scheduling mode to be selected;
   detecting a fourth event indicative of a release of said transmission function switch; and
   selecting said shift scheduling mode of said automated mechanical transmission for said forward direction of travel from a plurality of shift scheduling modes for said forward direction of travel in response to detecting all of said first, second, third, and fourth events.

2. The method of claim 1, wherein said first driver input device comprises a brake switch.

3. The method of claim 1, wherein said second driver input device comprises a throttle switch.

4. The method of claim 1, wherein said events are detected at a microprocessor.

5. The method of claim 1, wherein detecting said second event indicative of said actuation of said first driver input device said predetermined number of times comprises detecting a repeated actuation said first driver input device.

6. The method of claim 1, wherein detecting a third event indicative of said actuation of said second driver input device said number of times corresponding to the shift scheduling mode to be selected comprises detecting a repeated actuation said second driver input device.

7. The method of claim 1, wherein detecting said fourth event indicative of said release of said transmission function switch comprises repeatedly inquiring whether said function switch has been released.

8. The method of claim 7, wherein said repeated inquiries are limited to a small whole number.

9. A method of selecting a shift scheduling mode of an automated mechanical transmission system for a forward direction of travel comprising the steps of:
   actuating a transmission function switch;
   actuating a first driver input device a first predetermined number of times;
   actuating a second driver input device a second number of times corresponding to the shift scheduling mode to be selected; and
   releasing said transmission function switch; wherein the automated mechanical transmission system, in response to the release of said transmission function switch, selects said shift scheduling mode of said automated mechanical transmission for said forward direction of travel from a plurality of shift scheduling modes for said forward direction of travel, said selected shift scheduling mode corresponding to the first predetermined number of times and the second number of times.

10. The method of claim 9, wherein said second driver input device comprises a throttle switch.

11. The method of claim 9, wherein actuating said first driver input device said first predetermined number of times comprises repeatedly actuating said first driver input device.

12. The method of claim 9, wherein said first driver input device comprises a brake switch.

13. The method of claim 9, wherein actuating said second driver input device said second number of times corresponding to the shift scheduling mode to be selected comprises repeatedly actuating said second driver input device.

14. An apparatus for selecting one of a plurality of shift scheduling modes of an automated mechanical transmission for a forward direction of travel, comprising:
   a transmission function switch for actuation by a vehicle operator; a first sensor for sensing displacement of a first vehicle pedal; a second sensor for sensing displacement of a second vehicle pedal; and a microprocessor, operable to store at least two shift scheduling modes for said forward direction of travel, receive signals from said switch and said sensors, select from one of said shift scheduling modes for said forward direction of travel in response to activation of at least two of said first sensor, said second sensor, and said transmission function switch, and provide shift commands based upon the selected shift scheduling mode, wherein the selected shift scheduling mode corresponds to a number of times the second vehicle pedal has been displaced.

15. The apparatus of claim 14, wherein said first vehicle pedal comprises a brake pedal, and wherein sensing displacement of said first vehicle pedal comprises sensing a depression of said first vehicle pedal.

16. The apparatus of claim 14, wherein said second vehicle pedal comprises an accelerator pedal, and wherein sensing displacement of said second vehicle pedal comprises sensing a depression of said second vehicle pedal.

17. The apparatus of claim 14, wherein said microprocessor is further operable to store at least three shift scheduling modes.

18. The apparatus of claim 14, further comprising a readout for displaying data indicating selection of one of said shift scheduling modes.

19. The apparatus of claim 14 wherein said microprocessor further comprises a timer for establishing a preselected time interval.

* * * * *